Sept. 24, 1957 W. KUZYK ET AL 2,807,165
CRUISE CONTROL METER
Filed Nov. 3, 1953
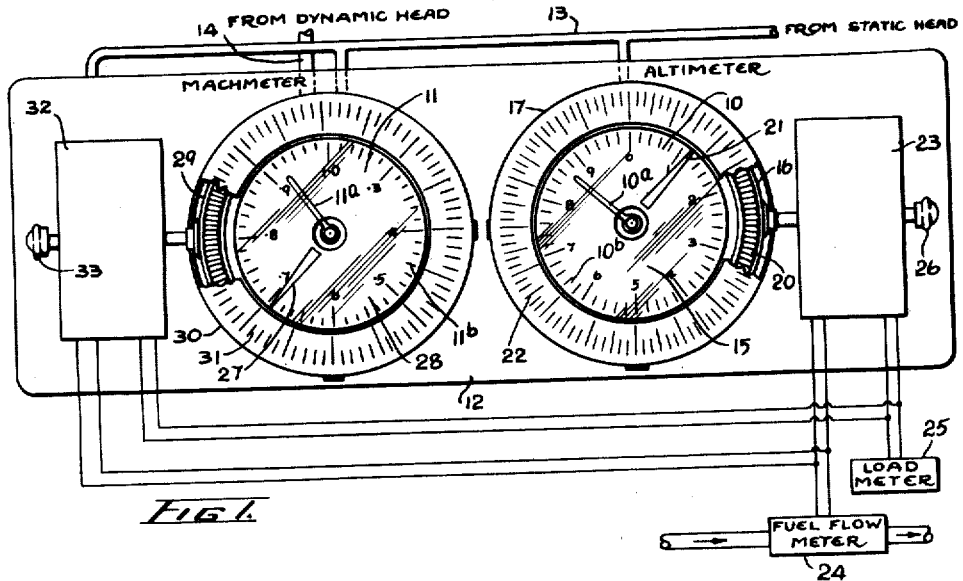
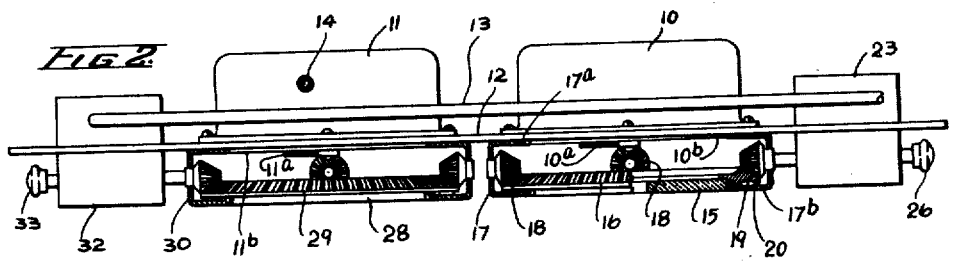
INVENTORS
WILLIAM KUZYK
DONALD C. WHITTLEY
PER
*Maybee & Legris*
ATTORNEYS

2,807,165

CRUISE CONTROL METER

William Kuzyk, Weston, Ontario, and Donald Charles Whittley, Etobicoke, Ontario, Canada, assignors, by mesne assignments, to Avro Aircraft Limited, Malton, Ontario, Canada, a corporation Application November 3, 1953, Serial No. 390,014

Claims priority, application Canada December 16, 1952

4 Claims. (Cl. 73—178)

This invention relates to aircraft instruments and particularly to such instruments provided to facilitate the economical operation of jet propeller aircraft.

It has been shown that to operate a jet propelled aircraft to attain the maximum range the aircraft should be brought to its operational altitude as quickly as possible and then flown in a gradual climb. The climb should be performed in such a way as to maintain a specific variation of Mach number (or speed) M with the ratio, $W/p$, of the aircraft weight $W$ to static pressure $p$: the rate of climb depends upon the reduction of weight of the aircraft as the flight progresses, the reduction of weight being of course due to the consumption of fuel, the disposal of ammunition and bombs, and similar causes. On reaching its destination, the aircraft should make a rapid descent.

If for some reason the flight must be performed at a constant altitude and the aforesaid gradual climb is inadmissible, the maximum range possible under such conditions may be achieved by flying at a Mach number which is varied in accordance with the reduction of weight of the aircraft as the flight progresses.

It is also known that to obtain optimum climb performance from jet propelled aircraft a specific variation of Mach number with $W/p$ is required; for maximum endurance another variation of Mach number with $W/p$ is required; and similarly for many other desired flight plans it can be determined what is the optimum variation of Mach number, altitude, engine speed, etc. as the weight of the aircraft changes.

The object of the invention is to provide an instrument which will indicate to the pilot the optimum conditions of flight for any given flight plan.

In the accompanying drawings forming a part of this specification and in which like characters of reference are used to designate like parts throughout the several views:

Fig. 1 is a schematic elevational view of an instrument and its associated computers, according to the invention;

Fig. 2 is a schematic partly sectional plan view of the instrument and its associated computers shown in Fig. 1.

The instrument shown in Figs. 1 and 2 embodies a standard altimeter 10 and a standard Machmeter 11, mounted side by side in a panel 12. Both the altimeter and the Machmeter are familiar to those skilled in the art, and they may for example be of the type manufactured by the Kollsman Instrument Division of Square D Company, Elmhurst, N. Y.; suffice it to say that the altimeter has a needle 10a (in the claims referred to as "first index means") indicating the altitude on a circular scale 10b on the panel 12, and the Machmeter has a needle 11a (in the claims referred to as "second index means") indicating the Mach number on a circular scale 11b, also on the panel 12. As viewed in Figure 1, the needles 10a and 11a rotate clockwise as altitude and Mach number respectively increase. The altimeter and the Machmeter are connected to sources of pressure in the usual way; thus both instruments are connected by a pipe 13 to a static head (not shown) whereby the static or ambient air pressure and hence the altitude may be sensed, and the Machmeter is also connected by a pipe 14 to a Pitot head (not shown) which senses the dynamic air pressure, the latter being dependent upon the airspeed of the aircraft. The term "altitude" as used herein refers to the "pressure altitude" of the aircraft rather than to the absolute altitude in feet or another linear unit.

Mounted in front of the scale 10b of the altimeter 10 is a transparent disc 15 held by a rotatable bezel ring 16. The bezel ring 16 is enclosed by an annular rim 17. Along its inner edge the rim 17 has a peripheral flange 17a which is secured to the panel 12 and surrounds the scale 10b, and along its outer edge the rim 17 has a peripheral flange 17b. The bezel ring 16 is rotatably supported within the rim 17 on spaced apart idler pinions 18 and a drive pinion 19, rollers 20 being provided between the bezel ring 16 and the outer flange 17b of the rim.

A control pointer 21 (in the claims referred to as "first control means") is inscribed on the disc 15; the disc 15 and bezel ring 16 rotate concentrically with the needle 10a of the altimeter and the pointer 21 reads upon the altimeter scale 10b. A scale 22 is inscribed on the outer surface of the rim 17b, and the control pointer 21 reads on the scale 22 as well as on the scale 10b. The scale 22 is graduated in pounds, indicating the weight of the aircraft, and is so calibrated with reference to the scale 10b of the altimeter that the ratio of the aircraft weight indicated by the control pointer 21 on the scale 22, to the altitude (i. e., static pressure) simultaneously indicated by the pointer 21 on the scale 10b, is always constant and is the maximum value of $W/p$ as determined by compressibility or buffet limitations, i. e. as determined by aerodynamic calculations or by actual flight testing. As viewed in Figure 1, the magnitudes of the weights on the scale 22 decrease in a clockwise direction, that is to say, in the sense of increasing altitude. From performance data sheet No. RJ1/0 issued by the Royal Aeronautical Society of England it can be seen that the ratio of aircraft weight to altitude, i. e. $W/p$ parameters, can be used for all aircraft.

An electronic computer 23 (which may for example be of the kind known as air data computers manufactured by Servomechanisms Inc., Westbury, N. Y.) is situated adjacent the altimeter 10 and is connected through the drive pinion 19 to the bezel ring 16 so that the control pointer 21 may be rotated by the operation of the computer. The computer is electrically connected to a fuel-flow meter 24 from which it receives electrical impulses indicating the consumption of fuel by the engines. In addition the computer is electrically connected to other metering or counting devices, indicated generally by the numeral 25, whereby electrical impulses indicating the expenditure of ammunition, the dropping of bombs and the like may be fed into it. Thus the computer 23 constitutes "aircraft weight responsive means" which rotates the control pointer 21 clockwise in accordance with the reduction of weight of the aircraft in flight.

A knob 26 is provided on the computer 23 whereby the initial setting of the control pointer 21 may be adjusted manually before flight and whereby the drive from the computer 23 to the bezel ring 16 may be disengaged altogether if required. Details of the adjusting and disengaging mechanism are not shown and are not a part of the invention. Those skilled in the art will understand that the desired control can be constructed in a number of ways; for example, a rotary movement of the knob 26 may effect a rotation of the bezel ring 16, overriding a friction drive from the computer, and an axial movement of the knob 26 may disengage the said friction drive, so that the control pointer will remain at its initial setting. Similarly, details of the metering devices 24, 25 and of the computer 23 are not shown, since such details are not part of the invention and a great variety of metering devices and computers may be used.

Now turning to the Machmeter, a control pointer 27 (in the claims referred to as "second control means") is inscribed on a transparent disc 28 mounted in front of the scale 11b, and the disc is held in a bezel ring 29. A rim 30 surrounds the bezel ring, and a scale 31 graduated in units of $W/p$ (where $W$=weight of the aircraft in pounds and $p$=atmospheric pressure in pounds per sq. in.) is inscribed on the rim and is read by means of the pointer 27. As will be described hereinafter, the pointer 27 is moved over the scale 31 by a computer 32 (which may also be an air data computer of the kind manufactured by Servomechanisms Inc., Westbury, N. Y.) to indicate the existing ratio $W/p$ for the aircraft, and for each value of $W/p$ indicated by the pointer on the scale 31 a corresponding Mach number is indicated by the pointer on the scale 11b. If the meter is to be used to indicate to the pilot the flight conditions necessary to achieve maximum range, the scale 31 is so related to the scale 11b that, for any value of $W/p$ indicated by the pointer 27 on the scale 31, the Mach number required for maximum range is indicated on the scale 11b. If the meter is to be used to indicate the required variation of Mach number with $W/p$ to give optimum climb performance, the scale 31 is calibrated accordingly. Obviously it is possible to produce various scales 31 each having a different $W/p$ vs. M relationship to the scale 11b, each relationship being applicable to a desired mode of flight. Thus a plurality of scales 31 can be provided on the rim 30, and by the use of a knob which selects a particular scale at will (and which of course adjusts the computer 32 accordingly) the instrument can be made to indicate, alternatively, optimum conditions for climb to cruising altitude, for maximum range at cruising altitude, for maximum endurance, for cruising flight with one engine out, etc. For simplicity the instrument will be described hereinafter, and is illustrated in the drawings, as having only one scale 31 which is calibrated with respect to the scale 11b to indicate the optimum relationship of $W/p$ to M for maximum range. The maximum value of $W/p$ as determined by compressibility or buffet limitation is marked on the scale 31 and represents the upper limit of aircraft operation.

The bezel ring 29 and hence the pointer 27 is adapted to be rotated coaxially with the Machmeter needle 11a by the computer 32 situated adjacent the Machmeter. The computer 32 is connected electrically to the fuel-flow meter 24 and to the other counting devices 25 in a manner similar to the computer 23, but in addition the computer 32 is collected to the static pressure system through the pipe 13. Thus both reduction of weight of the aircraft in flight and the static pressure of the surrounding air (i. e. the pressure altitude of the aircraft) are fed into the computer 32, which thereby constitutes "aircraft weight and pressure altitude responsive means," and the control pointer 27 is rotated across the Machmeter scale 11b in accordance with changes in the ratio $W/p$. Therefore unless the aircraft is flown in such a way as to maintain $W/p$ constant, the pointer 27 rotates over the scales 31 and 11b, and the pointer always indicates on the scale 11b the Mach number at which the aircraft should fly to achieve the best range available for the existing value of $W/p$. As viewed in Figure 1, the pointer 27 rotates clockwise, that is to say in the sense of increasing Mach number, as $W/p$ decreases. It can be seen from performance data sheet No. RJ1/3 issued by the aforementioned Royal Aeronautical Society that as the ratio $W/p$ varies, the Mach number at which an aircraft must be flown to attain maximum range varies in a manner peculiar to the type or model of aircraft, and therefore the characteristics of the computer 32 and the relationship of the scale 31 to the scale 11b must be determined from aerodynamic data or preferably from flight tests carried out on a prototype aircraft.

The computer 32 is provided with a knob 33 whereby the control pointer 27 can be rotated manually to an initial setting.

To effect a flight to obtain maximum range, the pilot, before take-off, must set the control pointer 21 to indicate on the scale 22 the initial gross weight of the aircraft, and must also set the control pointer 27 to indicate on the scale 31 the value of $W/p$ determined by dividing the initial gross weight of the aircraft by the atmospheric pressure at the airport. These settings are performed by manual rotation of the knobs 26 and 33. He must then take off and climb as rapidly as possible to cruising altitude. If sufficient power is available to attain the limiting maximum $W/p$, the cruising altitude is determined by this maximum $W/p$ and is indicated by the pointer 21, and having reached cruising altitude the pilot must fly the aircraft in such a manner that at all times the altimeter needle 10a coincides with the control pointer 21 and the Machmeter needle 11a coincides with the control pointer 27. The aircraft flight path takes the form of a gradual climb as the fuel is consumed. However, in aircraft having low thrust to weight ratios the limiting maximum $W/p$ is not reached, or is reached only after cruising for some time. To achieve maximum range below the limiting maximum $W/p$, the aircraft is brought to the cruising altitude which is determined by the minimum limit on rate of climb for the aircraft, and is then flown at the optimum engine R. P. M. for that altitude, keeping the Machmeter needle 11a coincident with the control pointer 27. If the optimum R. P. M. should exceed the manufacturer's recommended maximum cruise R. P. M., the pilot sets the throttle to obtain this maximum cruise R. P. M. As fuel is consumed the weight of the aircraft reduces and a gradual climb results. Whether flying below or at the maximum $W/p$, when the destination is reached the aircraft must be brought down to make a landing as quickly as circumstances permit.

An alternative flight plan must be followed when conditions are such that the flight is to be carried out at constant altitude. Under such conditions the aircraft is flown at the specified altitude and control pointer 27 will automatically represent the required Mach number to achieve best fuel economy. The pilot is required to maintain the Machmeter needle 11a coincident with the control pointer 27—R. P. M. will be decreased as fuel is consumed. For a convenient indication of the desired constant altitude the pilot may disengage the drive from the computer 23 to the bezel ring 16 and set the control pointer 21 at the desired altitude on the scale 10b. When the destination is reached the aircraft must again be brought down to make a landing as quickly as circumstances permit.

The flight of the aircraft can be rendered fully automatic by a further development of this invention whereby the angular discrepancy between the control pointers and their respective needles is measured electrically or by some other means, the resulting measurements being fed to an automatic control system actuating the engine and flying controls.

Methods of cruise control used in the past have required accurate measurement of the outside air temperature, but such measurement is becoming increasingly difficult as the speed of flight increases. By the use of an instrument according to this invention, in which direct reference is made to the Mach number rather than to the indicated air speed, the necessity for accurate measurement of outside air temperature is obviated, with consequent advantage.

It is to be understood that the form of the invention herein shown and described is to be taken as a preferred example of the same and that various changes in the shape, size and arrangement of the parts may be resorted to without departing from the spirit of the invention and the scope of the subjoined claims.

What we claim as our invention is:

1. An instrument to determine desired conditions of flight for the economical operation of a jet propelled aircraft, comprising an altimeter having first index means movable by the altimeter in accordance with pressure altitude variation and also having first control means for determining the desired position of the first index means, a Machmeter having second index means movable by the Machmeter in accordance with Mach number variation and also having second control means for determining the desired position of the second index means, aircraft weight responsive means coupled to either the first index means or the first control means for moving the one of said first means to which it is coupled relative to the other of said first means in accordance with variations in aircraft weight, and aircraft weight and pressure altitude responsive means coupled to either the second index means or second control means for moving the one of said second means to which it is coupled relative to the other of said second means in accordance with variations in the ratio of aircraft weight to pressure altitude.

2. An instrument as claimed in claim 1, including first manually operable means coupled to said one of said first means for moving said one of said first means to an initial position determined by the initial aircraft weight, and second manually operable means coupled to said one of said second means for moving said one of said second means to an initial position determined by the initial aircraft weight and altitude.

3. An instrument to determine desired conditions of flight for the economical operation of a jet propelled aircraft, comprising a Machmeter having index means movable by the Machmeter in accordance with Mach number variation and also having control means for determining the desired position of the index means, and aircraft weight and pressure altitude responsive means coupled to either the index means or the control means for moving the one of said means to which it is coupled relative to the other of said means in accordance with variations in the ratio of aircraft weight to pressure altitude.

4. An instrument to indicate desired conditions of flight for the economical operation of a jet propelled aircraft, comprising an altimeter having a rotatable needle movable across a scale to indicate pressure altitude, a Machmeter having a rotatable needle movable across a scale to indicate Mach number, a first control pointer rotatable concentrically with the altimeter needle, aircraft weight determining means, a first computer coupled to the first control pointer and actuated by the aircraft weight determining means for driving the first control pointer in accordance with reduction in aircraft weight during flight, means for moving the first control pointer to an initial position determined by one of the initial aircraft weight and a selected altitude, a second control pointer rotatable concentrically with the Machmeter needle, a second computer coupled to the second control pointer and actuated by the aircraft weight determining means and by pressure altitude for driving the second control pointer in accordance with variations in the ratio of aircraft weight to pressure altitude, and means for moving the second control pointer to an initial position determined by the initial aircraft weight and altitude.

References Cited in the file of this patent

UNITED STATES PATENTS

| | | |
|---|---|---|
| 2,356,339 | Morrison | Aug. 22, 1944 |
| 2,415,092 | Frische et al. | Feb. 4, 1947 |
| 2,553,983 | Saxman | May 22, 1951 |
| 2,620,149 | Strother | Dec. 2, 1952 |
| 2,630,987 | Hauptman | Mar. 10, 1953 |

UNITED STATES PATENT OFFICE
CERTIFICATE OF CORRECTION

Patent No. 2,807,165                                  September 24, 1957

William Kuzyk et al.

It is hereby certified that error appears in the printed specification of the above numbered patent requiring correction and that the said Letters Patent should read as corrected below.

Column 1, line 17, for "propeller" read -- propelled --.

Signed and sealed this 10th day of December 1957.

(SEAL)
Attest:
KARL H. AXLINE

Attesting Officer

ROBERT C. WATSON
Commissioner of Patents